Figure 5:
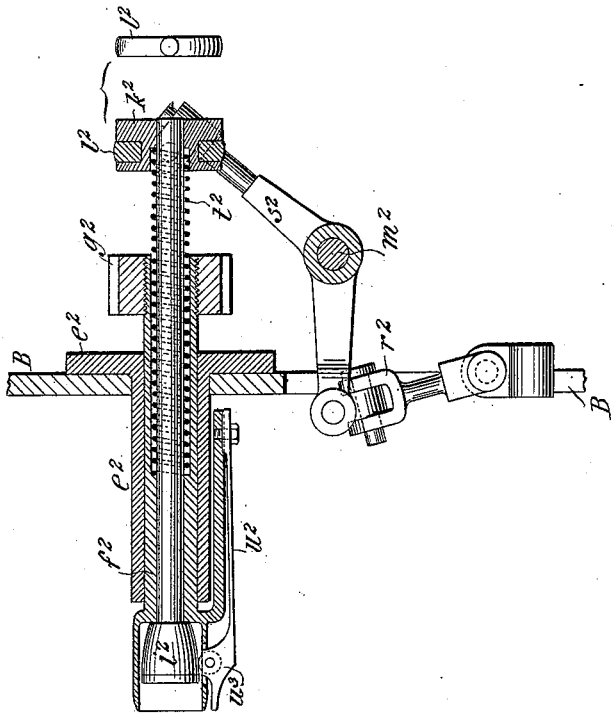

(No Model.) 8 Sheets—Sheet 1.
W. ROSE & H. H. WILLS.
MACHINE FOR WRAPPING AND SECURING TOBACCO IN PACKETS.
No. 594,968. Patented Dec. 7, 1897.
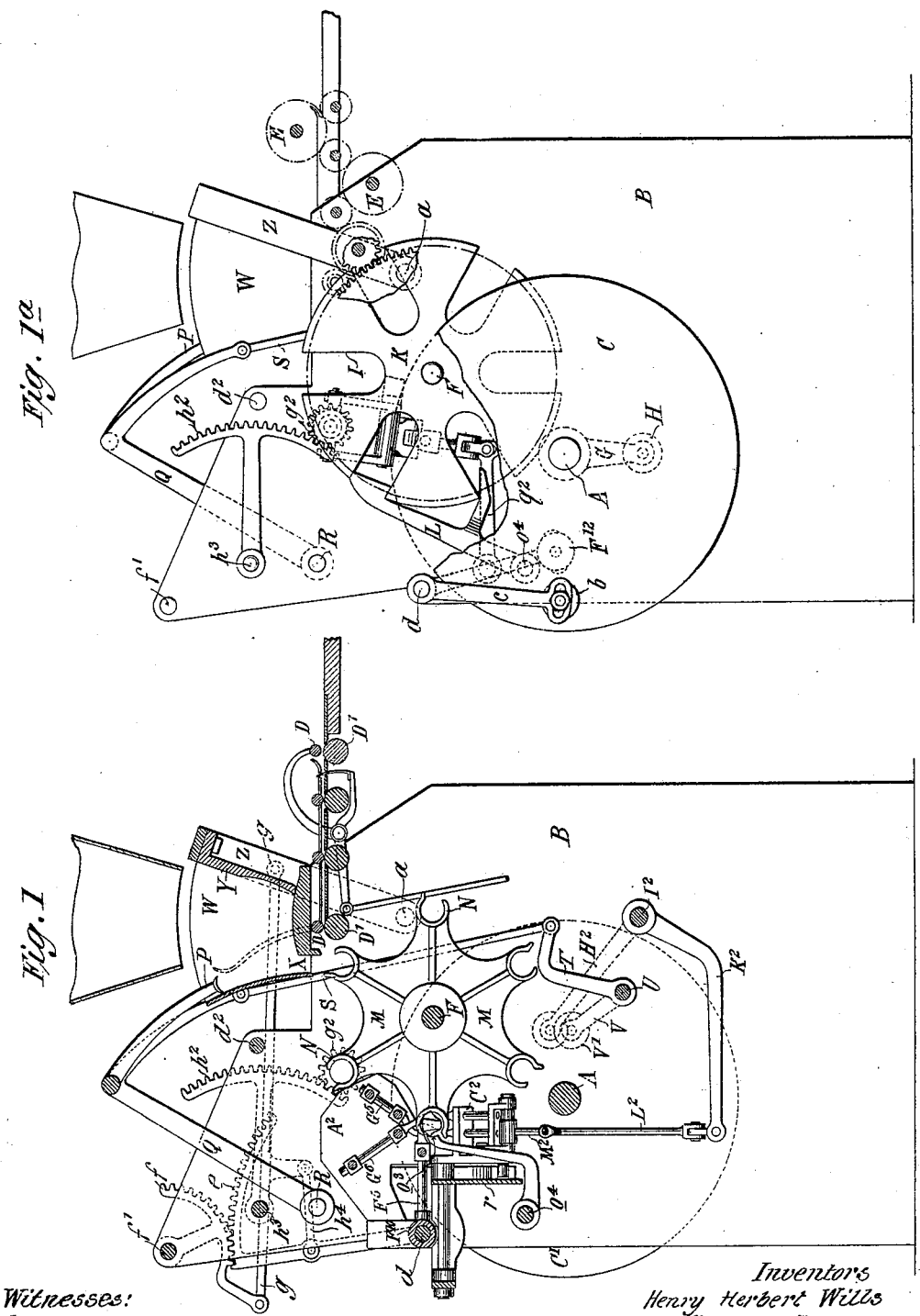
Witnesses:
Raphael Netter
Ernest Hopkinson
Inventors
Henry Herbert Wills
& William Rose
by Duncan & Page
Attorneys.

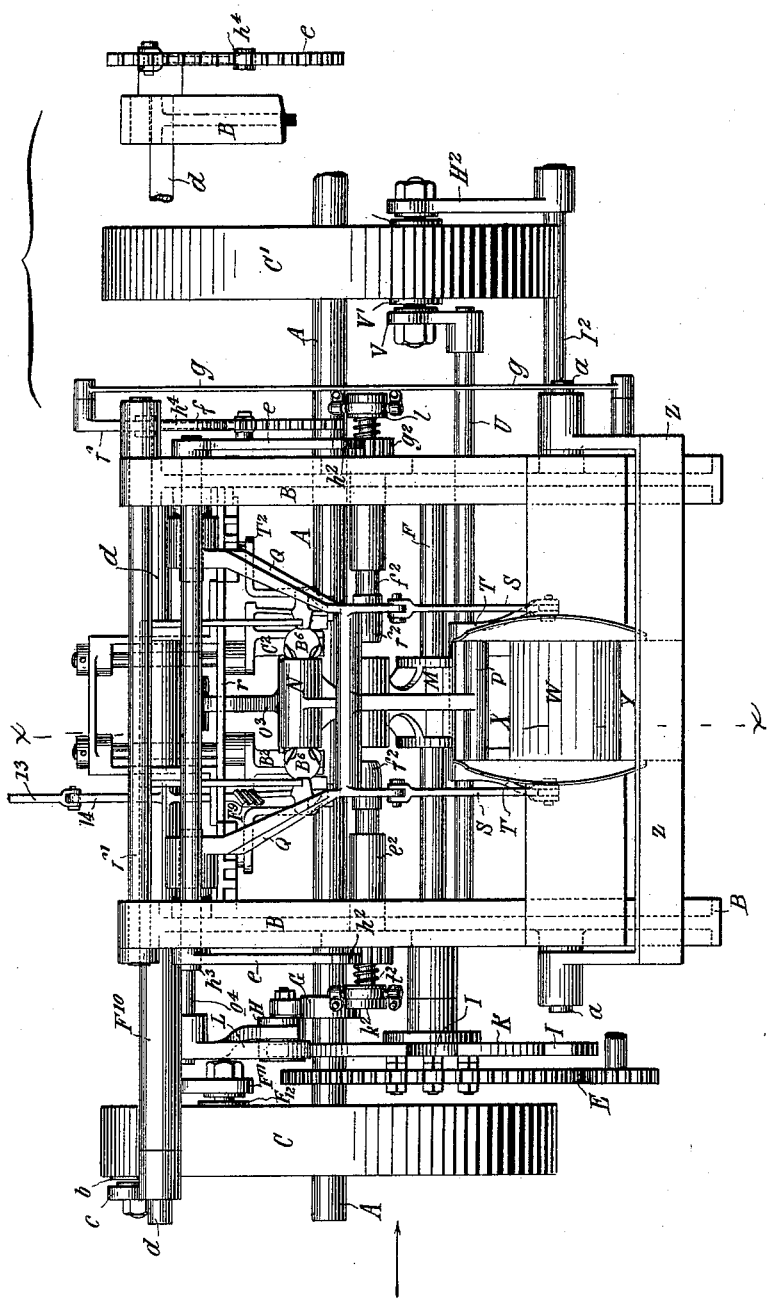

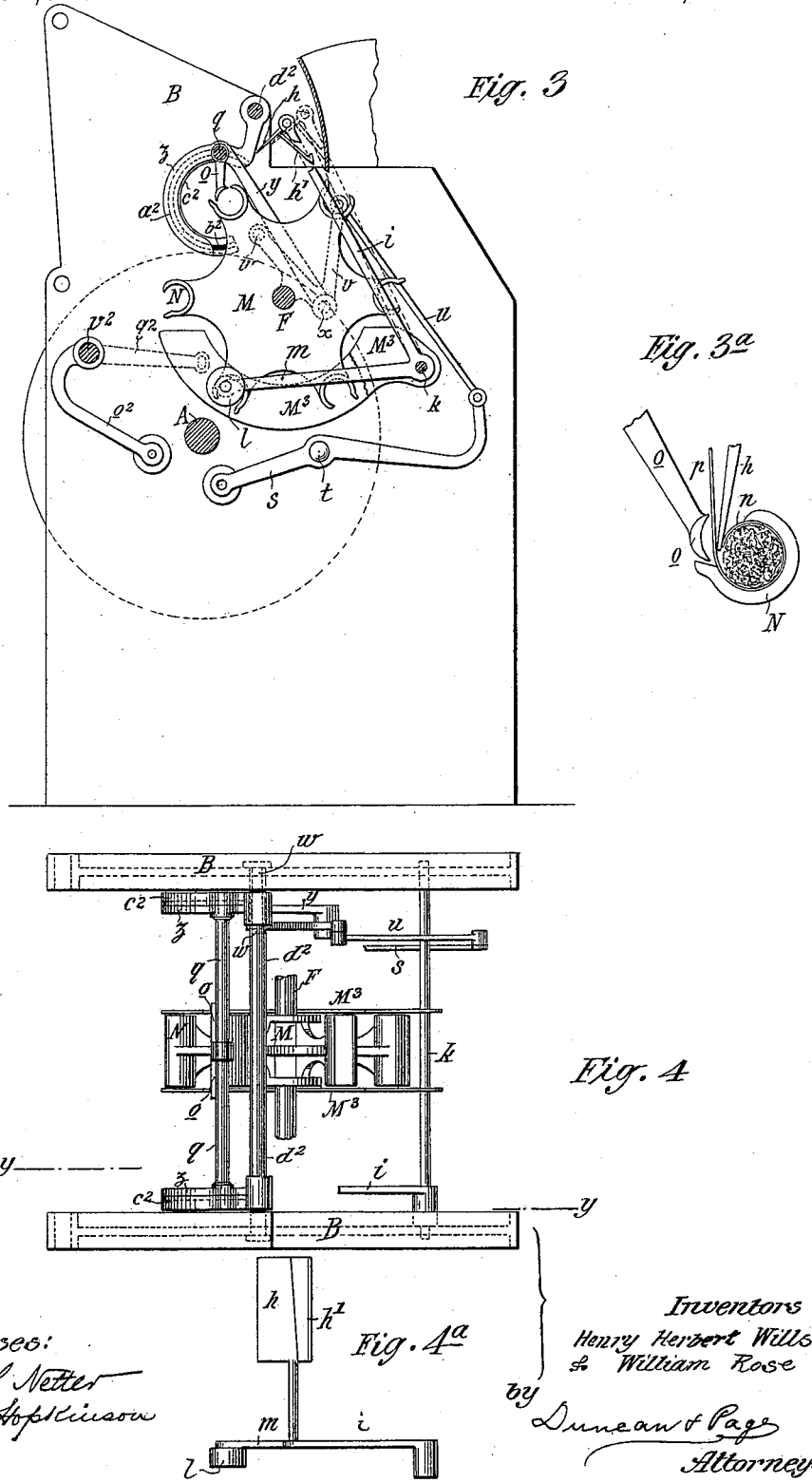

(No Model.) 8 Sheets—Sheet 4.

W. ROSE & H. H. WILLS.
MACHINE FOR WRAPPING AND SECURING TOBACCO IN PACKETS.

No. 594,968. Patented Dec. 7, 1897.

Witnesses:
Raphaël Netter
Ernest Hopkinson

Inventors
Henry Herbert Wills
& William Rose by Duncan & Page
Attorneys (No Model.) 8 Sheets—Sheet 5.
W. ROSE & H. H. WILLS.
MACHINE FOR WRAPPING AND SECURING TOBACCO IN PACKETS.
No. 594,968. Patented Dec. 7, 1897.
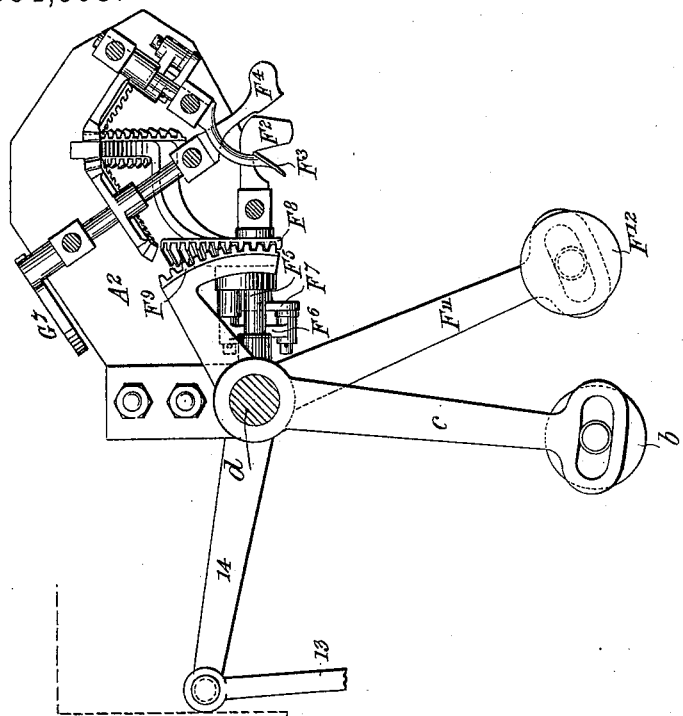
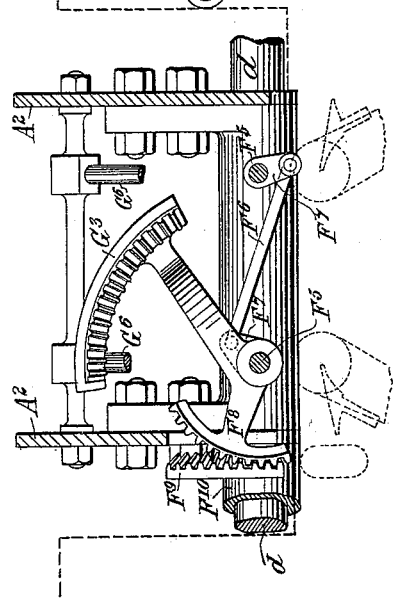
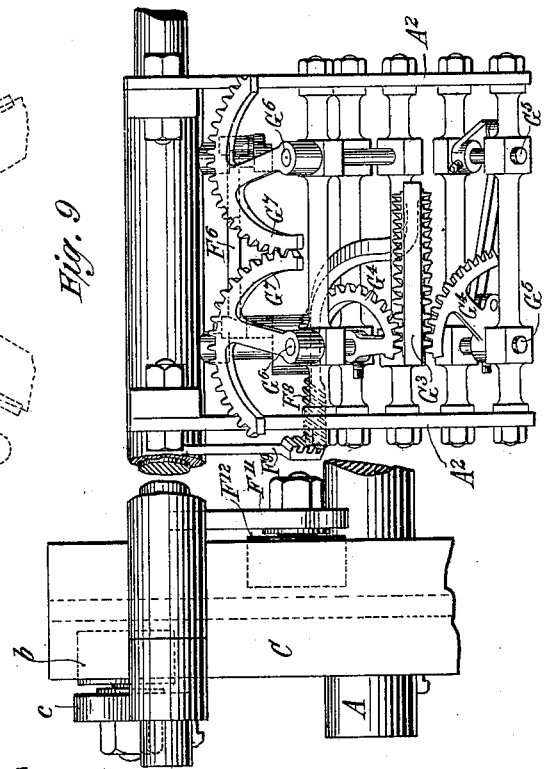
Witnesses:
Raphael Netter
Ernest Hopkinson
Inventors:
Henry Herbert Wills
& William Rose
by Duncan & Page
Attys.

(No Model.) 8 Sheets—Sheet 6.

W. ROSE & H. H. WILLS.
MACHINE FOR WRAPPING AND SECURING TOBACCO IN PACKETS.

No. 594,968. Patented Dec. 7, 1897.

Witnesses: Raphaël Netter, Ernest Hopkinson

Inventors: Henry Herbert Wills & William Rose
by Duncan & Page, Att'ys

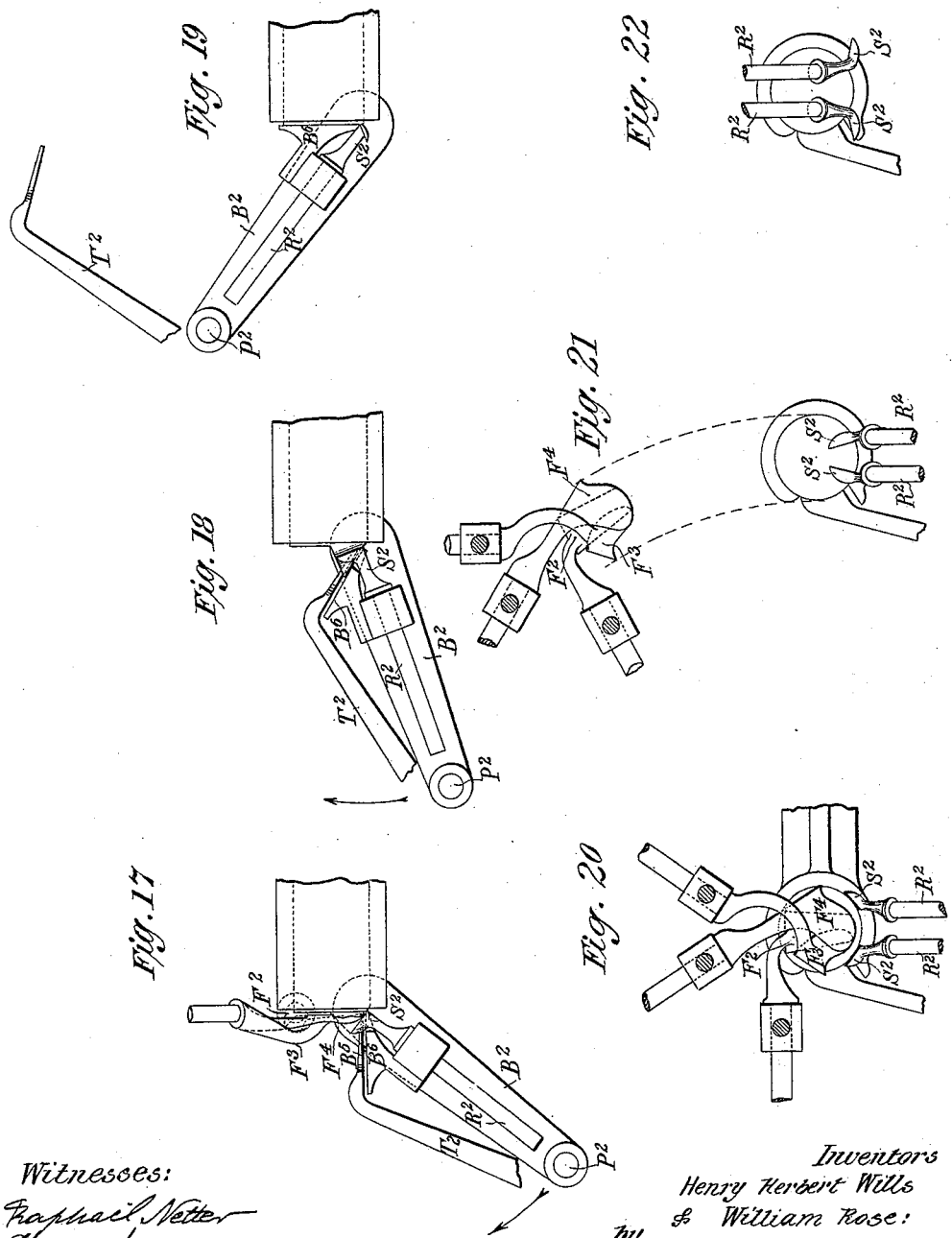

(No Model.) 8 Sheets—Sheet 8.
W. ROSE & H. H. WILLS.
MACHINE FOR WRAPPING AND SECURING TOBACCO IN PACKETS.
No. 594,968. Patented Dec. 7, 1897.
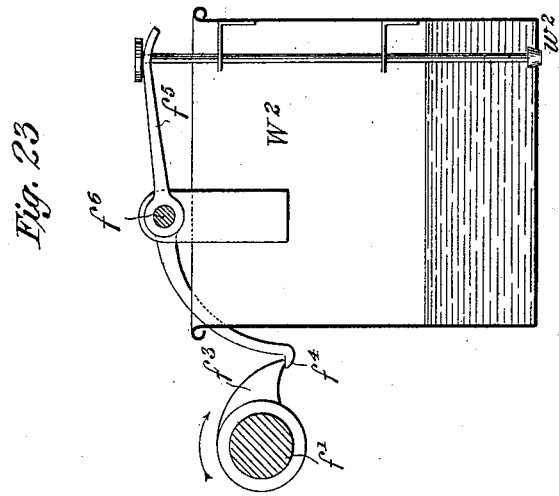
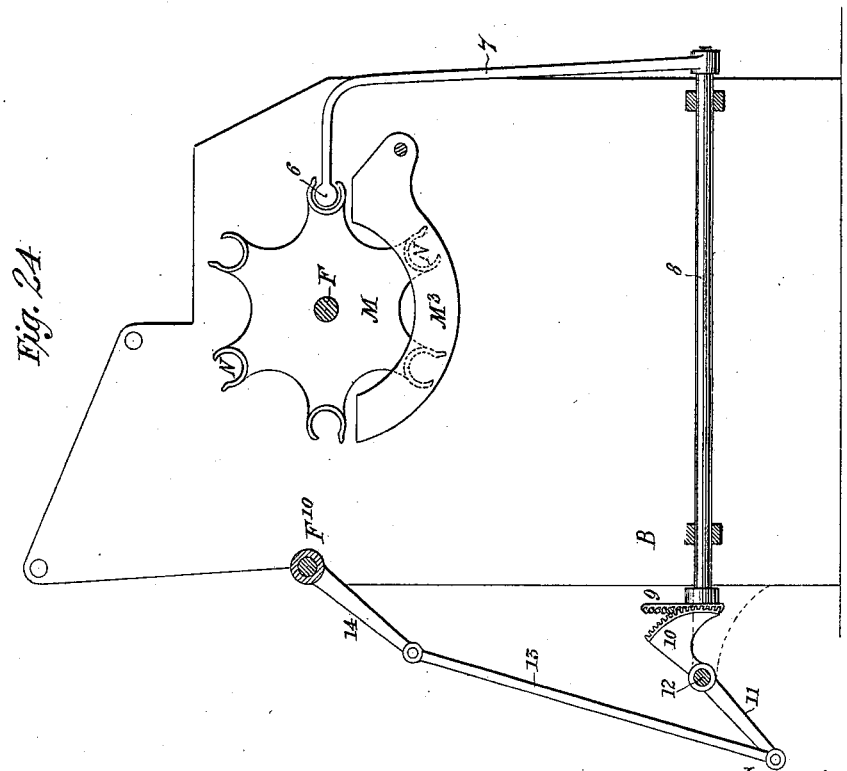
Witnesses:
Raphael Netter
Ernest Hopkinson
Inventors
Henry Herbert Wills
& William Rose
by Duncan & Page
Att'ys

UNITED STATES PATENT OFFICE.

WILLIAM ROSE, OF GAINSBOROUGH, AND HENRY HERBERT WILLS, OF LONDON, ENGLAND, ASSIGNORS, BY MESNE ASSIGNMENTS, TO THE WRIGHT'S AUTOMATIC TOBACCO-PACKING MACHINE COMPANY, OF LYNCHBURG, VIRGINIA.

MACHINE FOR WRAPPING AND SECURING TOBACCO IN PACKETS.

SPECIFICATION forming part of Letters Patent No. 594,968, dated December 7, 1897.

Application filed December 30, 1892. Serial No. 456,754. (No model.) Patented in England September 12, 1885, No. 10,837, and in Germany August 26, 1886, No. 38,546.

*To all whom it may concern:*

Be it known that we, WILLIAM ROSE, residing at Gainsborough, county of Lincoln, and HENRY HERBERT WILLS, residing in the city of London, England, subjects of the Queen of Great Britain, have invented new and useful Improvements in Machines for Wrapping and Securing Tobacco in Packets, (for which Letters Patent have been granted in Great Britain, No. 10,837, dated September 12, 1885, and in Germany, No. 38,546, dated August 26, 1886;) and we do hereby declare that the following is a full, clear, and exact description of the invention, which will enable others skilled in the art to which it appertains to make and use the same.

This invention relates to machinery for wrapping and securing tobacco in packets; and it consists in providing efficient machinery or apparatus, as hereinafter described, whereby the requisite quantities of tobacco are inclosed in wrappers by the said wrappers, after receiving the tobacco, being wrapped therearound and then having their ends folded or turned in by fingers or folders and being, if so required, secured in their folded positions by adhesive material supplied by the action of the machine while the ends of the wrapper are being folded, the finished packets being discharged from the machine by an ejector while other packets are being formed, the process being continuous, the different operations being performed on different packages at the same time.

We will describe this invention with reference to the accompanying drawings, in which for the purpose of clearness we have illustrated the several parts of the machine detached, although it is to be understood that the whole of the parts are combined in one machine.

Figure 6:
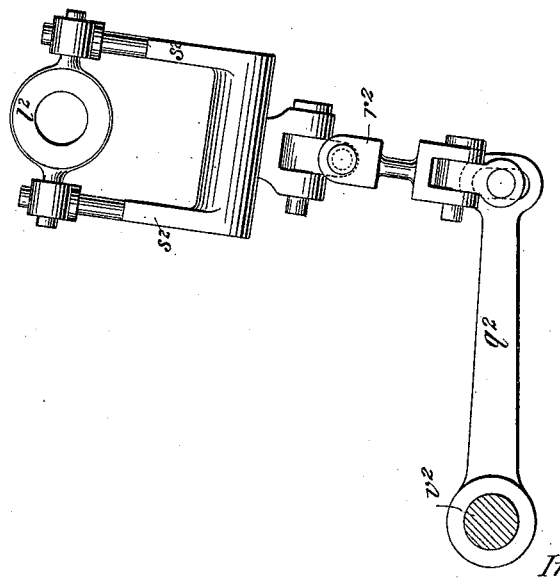
Figure 11:
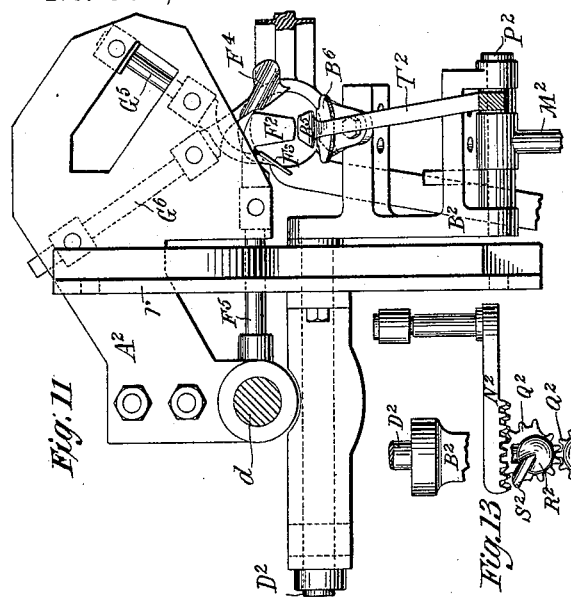

Figure 1 of our drawings is a cross-section of the wrapper and tobacco feeding mechanism through the line $x\,x$ of Fig. 2. Fig. 1$^a$ is an end elevation of the same in the direction of the arrow in Fig. 2. Fig. 2 is a plan view of the machine, some parts being omitted. Fig. 3 is a vertical section through the line $y\,y$ of Fig. 4, showing the rotating mold-boxes and devices for causing the wrapper to encircle the tobacco. Fig. 3$^a$ is a detail view of one of the mold-boxes, the wrapper, and holding-plates. Fig. 4 is a plan view of the devices shown in Fig. 3. Fig. 4$^a$ is a detail view of arm $i$ and plates $h$ and $h'$, shown in Fig. 3. Fig. 5 is a detail view of one of the plungers for forcing the tobacco endwise in the partially-formed packet, with devices for operating the same. Fig. 6 is an end view of the devices shown in Fig. 5. Figs. 7, 8, and 9 are detached views of the upper sets of folders which operate to fold in the ends of the wrappers and mechanism for operating the same. Figs. 10, 11, 12, 13, 14, 15, and 16 are detached and detail views of the lower sets of end-wrapper folders and mechanism for operating the same. Figs. 17, 18, 19, 20, 21, and 22 are views of the upper and lower sets of end-wrapper folders as seen in the different positions which they assume during their operation. Fig. 23 is the paste-reservoir and operating devices, and Fig. 24 is a detail view of the packet-ejecting devices.

The paper or other material to form the wrappers may be in a continuous length, to be divided into the requisite sizes to form the wrappers by suitable cutters as it is being fed into the machine, or it may be previously cut into sheets of the requisite size and fed into the machine sheet by sheet.

A is the main driving-shaft, mounted in suitable bearings in the framing B of the machine and carrying disks C C', provided with cam-grooves by which the various motions hereinafter described are obtained. The wrappers are fed into the machine by means of rollers D D', actuated by means of gearing E from the shaft F, to which motion is imparted from the main shaft A by means of an arm G, keyed thereon and carrying at its outer end a friction-roller H, which as the shaft A rotates engages in slots I, provided in a plate K, keyed fast on the shaft F, whereby the said shaft receives an intermittent partial rotary motion. The shaft F is prevented from rotating, when not acted upon by the arm G, by a detent L engaging one of the slots I in the plate K, but which is disengaged therefrom by the arm G just before the friction-roller H arrives in position to enter the slot for the purpose of imparting motion to the shaft.

On the shaft F is keyed a wheel or plate M, provided with recesses or mold-boxes N, in which the packets are formed. We have represented this wheel as having six mold-boxes; but any other convenient number may be employed provided the timing of the motions of the various parts of the machine be made to correspond, so as to cause a wrapper to be brought over a mold-box at each partial rotation of the wheel M. The mold-boxes are cylindrical in form and more than a half-cylinder, preferably about two hundred and fifty-five degrees of a complete cylinder. When a wrapper is in position over a mold-box, one edge of the said wrapper is held between the last pair of feeding-rollers D D' while the said wrapper is being forced into the mold-box by a plunger P, which is caused to descend for that purpose and then to rise again, leaving the wrapper in the mold-box ready to receive its charge of tobacco.

The plunger P is fast on an oscillating frame Q, mounted on studs R in the main frame B and connected by rods S to an arm T, fast on a rocking shaft U, which is mounted in bearings in the main frame and is provided at one end with an arm V, carrying a friction-roller V', working in a cam-groove in the disk C'; the said groove being suitably shaped to impart the necessary motions to the plunger P at the requisite periods. The charge of tobacco to be inclosed in the wrapper after being weighed is fed by means of an endless band of buckets or by other suitable automatic means into the hopper W, in the bottom of which is an opening X, through which the tobacco is caused to pass into the wrapper in the mold-box by the combined action of the pusher-plate Y and the plunger P, which former may constitute one of the sides of the hopper and which is connected to an oscillating frame Z, centered at $a$ to the main frame of the machine. An oscillating motion is imparted to the plate Y by means of an arm $c$, which is provided with a friction-bowl $b$, working in a cam-groove in the outer face of the disk C, the arm $c$ being fast on one end of a rocking shaft $d$, mounted in the main frame B. On the opposite end of the shaft $d$ is a toothed segment $e$, gearing with a corresponding segment $f$, fast on another rocking shaft $f'$, and to this latter segment the frame carrying the pusher-plate Y is connected by the rods $g$, so that a forward motion is imparted to the said pusher-plate at the proper moment to propel the tobacco from the hopper through the opening X, it then being caused to recede in readiness for the next operation. The charge of tobacco having passed into the opening X, the plunger P is caused to descend and compress the tobacco into the wrapper in the mold-box beneath, the edge of the wrapper which had been previously held between the rollers D D' being released and the opposite edge thereof held between the side of the hopper opposite the pusher-plate Y and a bar $h'$, fast on an arm $i$, keyed on a rocking shaft $k$, to which motion is imparted by a suitably-shaped cam or tappet fast on the main shaft A and acting on a roller $l$, mounted on the tail-piece $m$ of the arm $i$. The plunger P, having pressed the tobacco in the mold-box, is again elevated, after which the wheel M makes a partial rotation, (the edge of the wrapper being in the meantime released from between the bar $h'$ and the side of the hopper,) bringing an empty mold-box into position beneath the hopper to receive a wrapper and a charge of tobacco in the manner hereinbefore described, the mold-box previously charged being brought into the next position, (illustrated by Figs. 3 and 4,) where rotary motion is imparted to the tobacco and wrapper in the mold-box, so as to cause the wrapper to encircle the tobacco. Two pistons or plungers are then caused to enter the two opposite ends of the packet, so as to compress the tobacco to the required length, and then to recede to admit of the packet moving with the wheel M to the next position, where the ends of the wrapper are folded or turned in.

The encircling of the tobacco by the wrapper is effected in the following manner: A plate $h$, fixed to the upper end of the arm $i$, hereinbefore referred to, is caused to descend and press the edge $n$ of the wrapper into the mold-box on top of the tobacco, (see Fig. 3ª,) another plate $o$ being also caused to descend and wrap the opposite edge $p$ of the wrapper over the edge $n$, the plate $h$ being withdrawn slightly to admit of the entrance of the plate $o$.

The plate $o$ is fixed to a frame or bar $q$ and is actuated at the requisite periods to effect the above object by a cam or tappet fast on the main shaft A acting upon one end of a lever $s$, fitted to turn on a stud $t$. The opposite end of this lever is connected by a rod $u$ to a bent lever $v$, mounted on a stud $w$, which latter lever is also connected at $x$ to a tail-piece $y$, forming a continuation of one of two curved pieces $z$, to which the frame or bar carrying the plate or cover $o$ is attached. The curved pieces $z$ are each provided with a curved rib or projection $a^2$, fitting a correspondingly-shaped recess $b^2$, formed in another curved piece $c^2$, fast on a rocking shaft $d^2$, mounted in bearings in the main frame B. The centers from which the curves of the rib $a^2$ and recess $b^2$ are struck are in line with the lower edge of the plate $o$. The plate or cover $o$ having descended, as hereinbefore described, so as to lap one edge of the wrapper over its opposite edge, the said wrapper, with the tobacco inclosed therein, is caused to revolve in the mold-box in the following manner: On each side of the wheel M is fitted, so as to slide in a socket $e^2$, a hollow plunger $f^2$, (see Figs. 2, 5, and 6,) having fast on one end thereof a pinion $g^2$ in gear with a segment $h^2$, keyed on a rocking shaft $h^3$, mounted in bearings in the main frame B. The segment $h^2$ is connected by a link $h^4$ to the segment $e$, hereinbefore referred to. In the interior of the plunger $f^2$ is fitted to slide a solid conical piston $i^2$, the rod of which passes through the plunger $f^2$ and carries at its outer end a grooved collar $k^2$, in the groove of which is fitted a strap $l^2$, provided with pins or trunnions working in the two arms of a forked lever $s^2$, mounted on a stud $m^2$, so as to render the plunger $f^2$ capable of receiving a longitudinal as well as a rotary motion. On the exterior of each of the plungers $f^2$ is a spring-tongue piece $u^2$, provided with a projection $u^3$, which passes through an opening in the plunger and bears upon the piston $i^2$. The longitudinal motion of the plunger is derived from a cam or tappet on the main shaft A acting upon an arm $o^2$, keyed on the rocking shaft $v^2$, which also carries another arm $q^2$, connected by links $r^2$ to the double-armed or forked lever $s^2$, hereinbefore referred to.

The plungers $f^2$ first move inward and enter the open ends of the wrapper, carrying with them the inner pistons $i^2$ until the pinions $g^2$ come in contact with the back face of the socket $e^2$. The pistons $i^2$ are then caused, by means of the levers $s^2$ and their connections, to slide in the plungers $f^2$ against pressure of springs $t^2$, placed on the piston-rods between the plungers $f^2$ and the collars $k^2$, whereupon the pressure of the pistons upon the spring-tongues will be removed, and thus allow them to descend and nip the wrapper between them and the plungers $f^2$. A rotary motion is then imparted to the plungers $f^2$ by the rack $h^2$ and pinions $g^2$, thereby rotating the wrappers, with the tobacco therein, in the mold-box, causing the former to be wrapped smoothly around the latter. The pistons $i^2$ are then caused to enter farther into the wrappers, so as to compress the tobacco therein, and are then withdrawn from the wrappers into the plungers $f^2$ by the expanding action of the springs $t^2$. The inclined surfaces of the pistons $i^2$ as they enter the plungers act upon the projections on the spring-tongues, causing them to release the wrappers, and then as the pistons enter farther into the plungers shoulders or projections on the pistons come against collars or projections in the plungers, whereupon by a weighted lever on the shaft $v^2$ they will all be moved together, the plungers being thus withdrawn from the wrappers. The plate $o$ is then raised and the mold-box wheel M is rotated, bringing the packet into position to have the ends folded in and, if desired, secured by sealing-wax or other suitable adhesive material. Each of the packets when finished has by preference six folds or wraps at each end. When the mold-box containing a packet is brought into the position to have the ends of the packet folded, a plate or cover $o^3$, carried on the shaft $o^4$, upon which the detent L is fixed, enters the opening in the side of the mold-box and remains in this position until the packet is completed. The mechanism for folding in the ends of the packet is illustrated in Figs. 7 to 22, inclusive. Referring to these figures, $A^2 B^2 C^2$ are three oscillating frames each working on separate centers, the top frame $A^2$ being secured to the rocking shaft $d$ and carrying the mechanism for folding the first three wraps at each end of the packet, and the frames $B^2 C^2$, carrying the mechanism for folding the remaining three wraps at each end of the packet, being mounted on studs or short shafts $D^2 E^2$, fitted to turn in a plate $r$, attached to the frame B. The upper frame $A^2$ carries three pairs of folders $F^2 F^3 F^4$, each pair being arranged at different angles. The folders $F^2$ are mounted on the two spindles $F^5$, which are connected together by a link $F^6$ and crank-arms $F^7$, so as to work simultaneously. One of the folders $F^2$ is provided with a toothed segment $F^8$ in gear with a corresponding segment $F^9$, formed on a sleeve $F^{10}$, which is fitted to turn loosely on the rocking shaft $d$, the said sleeve being provided with an arm $F^{11}$, carrying a friction-roller $F^{12}$, working in a cam-groove in the inner face of the disk C, the necessary motions being imparted through gearing to the whole of the folders carried by the frame $A^2$ in the following manner:

On the same spindle which carries the segment $F^8$ is another toothed segment $G^3$, having two sets of teeth, with which gear corresponding segments $G^4$, mounted on one spindle of each of the pair of spindles $G^5$ and $G^6$, which carry, respectively, the folders $F^3$ and $F^4$, and the two spindles $G^5$ of the pair of folders $F^4$ are geared together at their upper ends by toothed segments $G^7$. When the packet is in position to have its ends folded, the frame $A^2$ is, by means of the cam-groove in the outer face of the disk C acting on the arm $c$, fast on the shaft $d$, first caused to descend into the position shown in Fig. 11, and while descending into this position the folders $F^2 F^3 F^4$ are caused to open out by the segmental rack $F^8$ rolling over the rack $F^9$, which in the meantime remains stationary, but is afterward caused to descend (by the cam-groove in the inner face of the disk C acting on the arm $F^{11}$) and impart motion to the rack $F^8$, thereby closing the folders $F^2 F^3 F^4$, the folders $F^2$ first turning in the top fold or wrap at each end of the packet, the folders $F^3$ then turning in one of the top side wraps at each end of the packet, after which the other top wraps are folded in by the folders $F^4$, the several folders $F^2 F^3 F^4$ being then in the position shown in Figs. 17 and 20, the folders $F^4$ partly overlapping the folders $F^3$ and the folders $F^3$ overlapping the folders $F^2$. The upper folds having thus been completed the lower frames $B^2 C^2$ commence to rise to fold in the remaining wraps. The spindles $D^2 E^2$, upon which these frames are mounted, are arranged at right angles to the rocking shaft $d$, to which the frame $A^2$ is fixed, and the raising and lowering motions are imparted to these frames at the requisite times by means of a suitably-shaped cam-groove in the outer face of the disk C' acting upon the arm H², fast on the rocking shaft I², Fig. 1, on which shaft is mounted a lever K², universally jointed to the lower ends of two connecting-rods L², the upper ends of the said rods being connected by links M², Figs. 1, 10, and 11, to the frames B² C². The motions of the folders carried by these frames are obtained by means of cam-grooves in the plate r.

As the construction and operations of the frames B² C² are precisely similar, (the one acting upon one end of the packet and the other on the opposite end thereof,) a description of one frame and its action will also serve to explain the other frame. We will therefore describe them with reference to the frame B², Figs. 10, 11, and 12.

Figure 13:
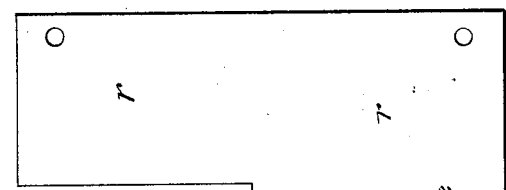
Figure 15:
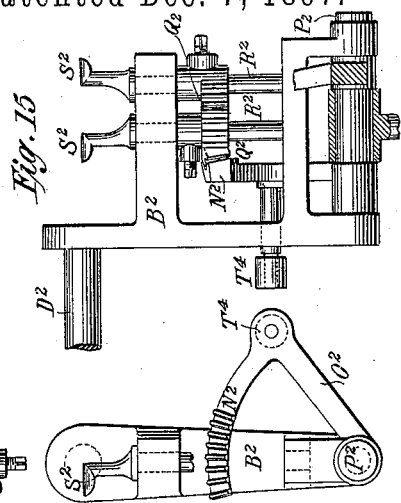
Figure 14:
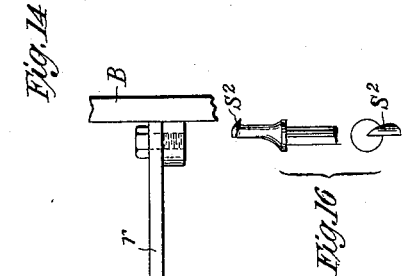
Figure 16:
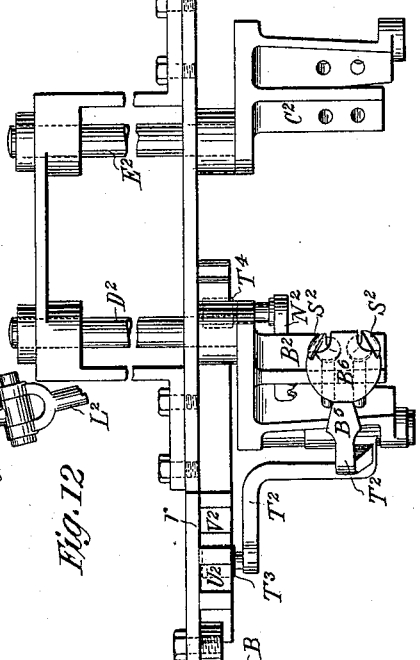

A toothed segment N², formed on a lever O², which is mounted on the stud P², to which the link M², hereinbefore referred to, is attached, is in gear with one of two pinions Q², keyed on the two spindles R², which carry the folders S², as shown clearly in Figs. 13 and 15, so as to cause the said folders to rotate and fold the lower side wraps of the packet, as hereinafter described. On the stud P² is also mounted a two-armed bent lever T², one of which arms is provided with a friction-roller T³, working in the cam-groove U² in the plate r, the other arm being provided with a plate B⁵, which is caused to descend and hold the bottom wrap in position on the plate B⁶ while the two bottom side wraps are being made.

Figures 10, 12:
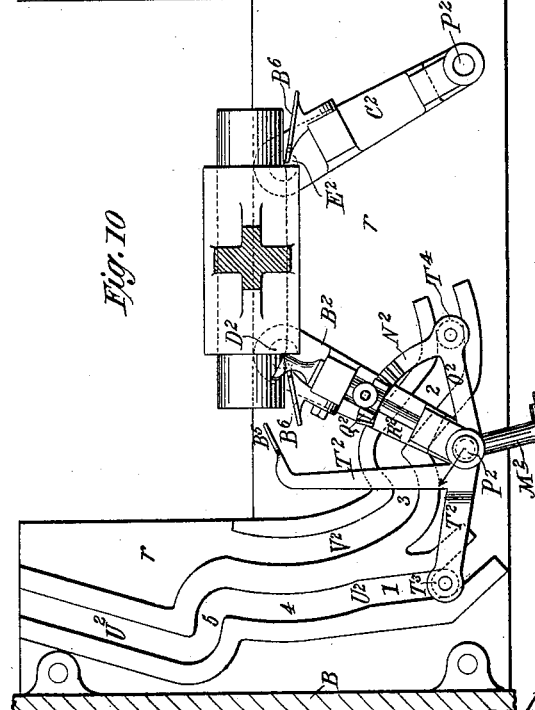

When the frame B² is in its lower position, the back edges of the plate B⁶ (which is rigidly secured to the frame) may be a little above the bottom of the packet, as shown in Fig. 10, or it may be arranged to descend below the packet, if desired, and brought into the position shown in said Fig. 10 when the frame commences to rise. When the frame commences to rise in the direction of the arrow, the portion 1 of the cam-groove U², by acting upon the friction-roller T³, causes the lever T² to turn on the stud P², so as to bring the plates B⁵ down onto the partially-folded end of the wrapper, as shown in Fig. 17. At this stage the upper frame A² commences to rise, removing the upper folders from the ends of the packet into the position shown in Fig. 21, while at the same time, by the continued rising of the frame B², the portion 2 of the cam-groove V², acting upon the friction-roller T⁴, imparts a rotary motion through the gearing N² and Q² to the folders S², causing them to move into the position shown in Figs. 18 and 21, thus forming the two lower side wraps in the wrapper, the plate B⁵ being inside the said wraps, as shown in Fig. 18. By the continued rising motion of the frame B² the portion 3 of the cam-groove V² causes the folders S² to rotate in the opposite direction out of contact with the end of the packet, as shown in Figs. 19 and 22, in which position they remain until the return motion of frame B².

The plate B⁵ remains in the position shown in Fig. 17, with the bottom wrap between it and the plate B⁶, during the time that the friction-roller T³ is passing along the concentric portion 4 of the cam-groove U² and the frame B² is moving to the position shown in Fig. 18. The plate B⁵ is then suddenly raised into the position shown in Fig. 19 by the friction-roller T³ entering the portion 5 of the cam-groove U², during which movement a drop of sealing-wax or other suitable adhesive material may be caused to fall from a receptacle onto the bottom wrap of the wrapper resting upon the plate B⁶, which plate is then, by the continued rising of the frame B², brought into the position shown in Fig. 19, so as to press the bottom wrap against the previously-formed wraps, thus completing and securing the end of the packet. The frame then descends to its lowest position.

The sealing-wax or other adhesive material for securing the ends of the packet is contained in a receptacle W², (see Fig. 23,) attached to the machine in any convenient manner. This receptacle is provided with valves $u^2$, which may be opened or raised from their seats at the requisite times by any convenient arrangement of mechanism actuated from any suitable moving part of the machine. As shown in the drawings, they are operated from the rocking shaft $f'$, hereinbefore referred to, upon which an arm or tappet $f^3$ is keyed, the outer end of which arm when the shaft $f'$ moves in the direction of the arrow acts upon one end $f^4$ of a lever fast on a rod $f^6$, which may be centered to the sides of the receptacle W², the said rod carrying the two arms $f^5$, which are caused to act upon the valve-spindles so as to elevate the valves and allow sufficient quantity of the adhesive material to pass from the receptacles onto the bottom wrap of the packet and then to return to their seats. The rocking shaft $f'$ is free to move in the reverse direction without causing the valves to be operated. The packet having been completed the mold-box wheel M makes a partial rotation, carrying the completed packet between cheeks or guides M³ into position to be ejected from the mold-box and bringing another packet into position to be completed, while other packets are in the course of being formed. The completed packets are forced from the mold-boxes by an ejector (see Fig. 24) consisting of a disk 6, formed on the upper end of a bar 7, fast on a rocking shaft 8, mounted in bearings in the lower part of the main frame B. This shaft is provided with a toothed segment 9 in gear with a corresponding segment 10 on one end of a lever 11, centered at 12 to a suitable bracket secured to the frame B. The outer end of the lever is connected by a rod 13 to an arm 14 on the sleeve F¹⁰, hereinbefore referred to, so that each time the said sleeve is operated, as hereinbefore described, to effect the folding of the upper wraps in the ends of the packet the disk 6 is caused to pass through a mold-box containing a completed packet, thereby ejecting the said packet from the mold-box into a suitable receptacle placed in position to receive it.

It will be seen from the description given and on examination of the drawings that the several stages in the formation of a packet are taking place simultaneously upon several packets—that is to say, while one packet is being ejected from the machine another packet is being completed and another packet is being formed into a cylindrical shape, while other wrappers are being charged with tobacco.

We do not necessarily limit ourselves to the machine with the sealing arrangement attached, as it may be dispensed with and the sealing be effected by hand afterward or be entirely omitted.

Having now particularly described and ascertained the nature of our said invention and in what manner the same is to be performed, we declare that what we claim is—

1. In a machine for making cylindrical packets of tobacco or similar material, a mold-wheel provided with a series of partly-cylindrical mold boxes or recesses in which the packets are formed, wrapper-feeding mechanism adapted to feed wrappers in position over the mold-boxes, and devices for intermittently and simultaneously operating the mold-wheel and wrapper-feeding devices, substantially as set forth.

2. In a machine for forming cylindrical packets of tobacco or similar material, a mold-wheel provided with partly-cylindrical mold boxes or recesses, devices for feeding wrappers intermittently to the mold-boxes and devices for holding such wrappers in position over the mold-boxes during the operation of the packing devices, substantially as set forth.

3. In a machine for forming cylindrical packets of tobacco or similar material, a mold-wheel provided with partly-cylindrical mold-recesses, devices for feeding wrappers to such mold-recesses and devices for retaining such wrappers in position, and mechanism for feeding tobacco or similar material onto the wrappers in the mold-recesses.

4. In a machine for forming cylindrical packets of tobacco or similar material, a mold-wheel provided with partly-cylindrical mold-recesses, devices for feeding wrappers to such mold-recesses and devices for retaining such wrappers in position, mechanism for feeding tobacco or similar material onto the wrappers in the mold-recesses, and a plunger for compacting the material to be wrapped into cylindrical shape, substantially as set forth.

5. In a machine for forming cylindrical packets of tobacco or similar material, the combination with a mold-wheel provided with partly-cylindrical mold boxes or recesses and wrapper and tobacco feeding mechanism, of a plunger for compacting the tobacco or similar material and movable pistons adapted to be inserted into the ends of the mold-recesses to compress the tobacco endwise and be withdrawn therefrom at each partial revolution of the mold-wheel, substantially as set forth.

6. In a machine for forming tobacco or similar material into cylindrical packets, the combination with hollow rotating plungers having pistons fitted to slide therein for pressing the tobacco into packets of the required length, of a mold-box and means for nipping the ends of the wrapper while the plungers are being rotated for the purpose of rolling the tobacco in the mold-box, substantially as hereinbefore described.

7. In combination with the partly-cylindrical mold-boxes of a machine for forming packets of tobacco or similar material, wrapper-folding devices consisting of a flat plate for folding down the first edge of the wrapper and an arm provided with a concave folding-foot for folding the second edge of the wrapper down upon the already-folded edge, substantially as shown and described.

8. The combination with mold-boxes, as N, having open sides, of plates, as $h$ and $o$, the former operating to press one edge of the wrapper upon the tobacco and the latter to fold the opposite edge of the wrapper over the pressed-down edge, and means for afterward rolling the tobacco and wrapper in one of the mold-boxes, substantially as shown and described.

9. In combination with a mold-box having an open side and adapted to contain a charge of tobacco unsecured by a wrapper, to form a partially-wrapped packet, of devices for engaging the ends of the wrapper and means for rotating such devices to cause the packet to be rolled in the mold-box for the purpose of smoothly fitting the wrapper to the tobacco, substantially as set forth.

10. In combination with mold-boxes having open sides and adapted to contain charges of tobacco for packets, of wrapper and tobacco feeding devices, devices for folding the wrappers around the tobacco, devices for folding in the ends of the wrappers, automatically-operating devices for applying adhesive or sealing material to the last end of the wrappers and devices for pressing such end folds against the previously-made folds to complete the packets, substantially as set forth.

In testimony whereof we have signed our names to this specification in the presence of two subscribing witnesses.

W. ROSE.
HENRY HERBERT WILLS.

Witnesses to the signing of the said William Rose:
J. R. RAITHBY,
J. BROWN.

Witnesses to the signing of the said Henry Herbert Wills:
CHAS. W. TURNER,
RICHARD MATTHIAS.